US008631133B1

(12) United States Patent
Jonnala et al.

(10) Patent No.: US 8,631,133 B1
(45) Date of Patent: Jan. 14, 2014

(54) METHOD AND SYSTEM OF PROVIDING A VIRTUAL TRANSPORT SESSION

(75) Inventors: Ramana Jonnala, Sunnyvale, CA (US);
Ronald S. Karr, Palo Alto, CA (US);
Dhanesh Joshi, Santa Clara, CA (US)

(73) Assignee: Symantec Operating Corporation,
Mountain View, CA (US)

( * ) Notice: Subject to any disclaimer, the term of this patent is extended or adjusted under 35 U.S.C. 154(b) by 1613 days.

(21) Appl. No.: 10/430,754

(22) Filed: May 6, 2003

(51) Int. Cl.
*G06F 15/16* (2006.01)
(52) U.S. Cl.
USPC .......................... 709/227; 709/228; 709/238
(58) Field of Classification Search
USPC .......................... 709/227, 228, 238
See application file for complete search history.

(56) References Cited

U.S. PATENT DOCUMENTS

| | | | | |
|---|---|---|---|---|
| 5,892,907 A | * | 4/1999 | Harper et al. | 709/200 |
| 5,966,705 A | * | 10/1999 | Koneru et al. | 707/9 |
| 6,157,630 A | * | 12/2000 | Adler et al. | 370/338 |
| 6,412,009 B1 | * | 6/2002 | Erickson et al. | 709/228 |
| 6,721,792 B2 | * | 4/2004 | Erickson et al. | 709/227 |
| 6,983,139 B2 | * | 1/2006 | Dowling et al. | 455/414.2 |

OTHER PUBLICATIONS

Krueger, et al., Network Working Group—RFC: 3347, "Small Computer Systems Interface Protocol Over the Internet (iSCSI) Requirements and Design Considerations," Jul. 2002, pp. 1-26.

* cited by examiner

*Primary Examiner* — Philip B Tran
(74) *Attorney, Agent, or Firm* — Campbell Stephenson LLP

(57) ABSTRACT

A method and system of providing a virtual transport session is disclosed. According to one embodiment, a virtual transport session is provided by establishing a virtual transport session between an initiator module and a target module across a network, wherein the virtual transport session comprises a transport session. Thereafter, information is transferred between the initiator module and the target module using the virtual transport session. According to another embodiment, establishing a virtual transport session between an initiator module and a target module across a network comprises associating a globally unique identifier to an initiator module.

28 Claims, 8 Drawing Sheets

METHOD AND SYSTEM OF PROVIDING A VIRTUAL TRANSPORT SESSION

BACKGROUND

1. Technical Field

The present invention relates to data storage and retrieval generally and more particularly to a method and system of providing a virtual transport session.

2. Description of the Related Art

Information drives business. As the need to quickly and reliably store and access large volumes of data has increased, a number of storage techniques and architectures have been developed. One such architecture is the Storage Area Network (SAN). A SAN is a special-purpose network (or subnetwork) whose primary purpose is the interconnection and transfer of data among and/or between one or more data processing systems and one or more data storage elements. Conventional SANs comprise a number of data storage elements (e.g., disks, tapes, disk arrays, tape arrays, RAID array subsystems, robotic tape libraries, filers, and file servers, etc.) and data processing systems (e.g., servers, work stations, etc.) coupled together via a number of coupling elements (e.g. routers, bridges, switches, hubs, etc.) and Fibre Channel (FC) communication links. The term SAN is usually (but not necessarily) identified with block I/O services rather than file access services. More recently, IP-based storage area networks or "IP SANs" have been developed and implemented.

FIG. 1 illustrates an IP storage area network according to the prior art. The IP SAN of the illustrated embodiment includes a data processing system 100 coupled to a number of remote storage elements via a network 106 and a remote host 108 (e.g., a file server data processing system). Exemplary remote storage elements of the embodiment of FIG. 1 include disk drive 102 and tape drive 104. In IP storage, the TCP/IP suite of protocols is frequently used as a storage interconnect to transfer block-level data between initiator and target devices or modules (e.g., initiator and/or target hardware, software, or a combination thereof). An IP SAN is a storage area network based on the Internet Protocol (IP), typically transmitting over Gigabit Ethernet rather than on the Fibre Channel framework traditionally used for SANs. The Transmission Control Protocol (TCP), Infiniband (IB) Interface, Internet Small Computer System Interface (iSCSI), Internet Fibre Channel Protocol (iFCP), and Fibre Channel over IP (FCIP), also referred to as FC/IP, Fibre Channel tunneling, or storage tunneling storage transports may be implemented and utilized in an IP storage system.

FIG. 2 illustrates protocol stacks according to the prior art. In the depicted system, an initiator module 200 (e.g., a server) and a target module 202 (e.g., a data storage element) are coupled together via a network 204 (e.g., a TCP/IP network). Each module in turn implements a protocol stack including an application layer 206, a SCSI layer 208, an iSCSI layer 210, a TCP layer 212, an IP layer 214, and a Link/Ethernet layer 216 as shown. In a conventional iSCSI system, each stack layer provides an abstraction of one or more lower layers to the layer immediately above. Each layer may also operate on or with a distinct data unit type. In addition to providing an abstraction of TCP layer 212 to SCSI layer 208, iSCSI layer 210 enables the target module 202 to be presented to and accessed by initiator module 200 as if it were a local SCSI device. Alternatively or additionally an initiator and target may be coupled together using an Infiniband (IB) stack 218 and an Infiniband network 220 as shown.

iSCSI is an SCSI transport protocol for mapping of block-oriented storage data over TCP/IP networks. The iSCSI protocol enables universal access to storage devices and storage-area networks (SANs) over standard Ethernet-based TCP/IP networks. These networks may be dedicated networks or may be shared with traditional Ethernet applications. IP LAN/wide-area network (WAN) routers and switches can be used to extend the IP storage network to the wide area for applications such as synchronous and asynchronous remote disk copy or tape backup and restore. In the WAN environment, TCP will ensure data reliability, manage network congestion, and adapt retransmission strategies to WAN delays.

IP Ethernet network infrastructures provide major advantages for interconnection of servers to block-oriented storage devices. IP networks provide security, scalability, interoperability, network management, storage management, and are cost-effective.

The Small Computer Systems Interface (SCSI) is a popular family of protocols for communicating with I/O devices, especially storage devices. There are two types of devices in SCSI protocol; the SCSI Initiators (clients) start the communications and the Targets (servers) responds. The initiators are devices that request commands be executed. Targets are devices that carry out the commands. The endpoint, within the target, that executes the command is referred to as a "logical unit" (LU) and is addressed using a logical unit number of "LUN". A target is a collection of logical units, in general of the same type, and is directly addressable. The structure used to communicate a command from an application client to a device server is referred to as a Command Descriptor Block (CDB). An SCSI command or a linked set of commands is referred to as a "task." Only one command in a task can be outstanding at any given time. SCSI command execution results in an optional data phase and a status phase. In the data phase, data travels either from the initiator to the target, as in a WRITE command, or from the target to the initiator, as in a READ command. In the status phase, the target returns the final status of the operation. The status response terminates an SCSI command or task.

The basic function of the SCSI driver is to build SCSI Command Descriptor Blocks (CDB) from requests issued by the application, and forwards them to the iSCSI layer. The SCSI driver also receives CDBs from the iSCSI layer and forwarding the data to the application layer.

iSCSI protocol is an Internet draft standard being defined to allow SCSI commands to be carried over TCP/IP protocol. The iSCSI protocol is discussed at greater length in Krueger, M., Haagens, R. Sapuntzakis, C. and M. Bakke, "Small Computer Systems Interface protocol over the Internet (iSCSI) Requirements and Design Considerations", RFC 3347, July 2002 and Satran, J., Meth, K., Sapuntzakis, C., Chadalapaka, M. and E. Zeidner, "iSCSI", draft-ietf-ips-iscsi-20.txt, Jan. 19, 2003, both of which are incorporated by reference herein in their entirety and for all purposes.

iSCSI provides initiators and targets with unique names as well as a discovery method. The iSCSI protocol establishes communication sessions between initiators and targets, and provides methods for them to authenticate one another. An iSCSI session may contain one or more TCP connections and provides recovery in the event connections fail. SCSI CDBs are passed from the SCSI generic layer to the iSCSI transport layer. The iSCSI transport layer encapsulates the SCSI CDB into an iSCSI Protocol Data Unit (PDU) and forwards it to the Transmission Control Protocol (TCP) layer. On a read, the iSCSI transport layer extracts the CDB from the iSCSI PDU, received from the TCP layer, and forwards the CDB to the SCSI generic layer. iSCSI provides the SCSI generic command layer with a reliable transport.

The iSCSI protocol enables a methodology for both naming and address of initiators and targets. iSCSI provides a means of uniquely identifying (naming) iSCSI initiators and targets with a URN like iSCSI Name. In addition to an iSCSI Name each iSCSI initiator and target has one or more addresses. Addresses can change as an initiator or target move, but the name stays the same. For human readability initiators and targets may also have a non-unique alias.

The iSCSI Names are used in iSCSI: 1) to identify an initiator and target that may be addressable via more than one IP address and TCP port, 2) as an identifier for configurations that present multiple initiators or targets or both behind a single IP address and TCP port, 3) as a method to recognize multiple paths to the same initiators or targets on different IP addresses and TCP ports, 4) as an identifier for initiators and targets to enable them to recognize each other regardless of IP address and TCP port mapping on intermediary firewalls, and 5) as a symbolic address for source and destination targets for use in third-party commands.

The iSCSI Name defines a method to provide naming authorities with a unique top-level name space. The use of the naming authority means that iSCSI Names can be assigned by OS vendors, driver or NIC vendors, device vendors, gateway vendors, service provider, or even the customers. An iSCSI Name consists of three parts: a type designator, followed by a naming authority, with the remaining format designated by the naming authority. In the first iSCSI Name of the following examples "iscsi" is the type designator and the naming authority is "com.acme".

Examples of typical iSCSI Names are as follows:
iscsi.com.acme.sn.8675309
iscsi.com.acme.sw.hostid.4567890

The target may also provide a default iSCSI Target Name called "iSCSI" that is not a globally unique name. An initiator can log into this default target iSCSI Target Name and use a text command called "SendTargets" to retrieve a list of iSCSI Target Names that exist at that address.

iSCSI targets can be identified by a flexible path address (URL), where the path is the combination of DNS name or IP address, a TCP port, and the target iSCSI Name. An iSCSI address specifies a single path to an iSCSI target. The iSCSI address contains the iSCSI Name and is presented in a URL-like format. The iSCSI address format is as follows.

<domain-name>[:<port >]/<iSCSI Name>

The iSCSI address or URL is not generally used within normal connections between iSCSI initiators and targets; it is primarily used during discovery.

An alias is simply a descriptive name that can be assigned to an initiator or target that is independent of the iSCSI Name, and does not have to be unique. iSCSI Names and aliases are encoded in the UTF-8 text format, which allows them to include international characters, as well as ASCII.

Domain Name Service (DNS) may be used to resolve the <domain-name> of the URL to one or multiple IP addresses. When a domain-name resolves to multiple IP addresses, these addresses should be equivalent for functional purposes. This means that the addresses can be used interchangeably with consistent performance. The discovery process responds to two basic inquiries from an initiator: 1) where is iSCSI Target Name "iscsi.com.acme.sn.8675309"? and 2) I am iSCSI Initiator Name "iscsi.com.ame.sw.hostid.4567890" which target should I attempt to access?

An iSCSI initiator can discover an iSCSI target in the following different ways: 1) by configuring the target's address on the initiator, 2) by configuring a default target address on the initiator and the initiator connects to the target and requests a list of iSCSI Names, via a separate SendTargets command, 3) by issuing Service Location Protocol (SLP) multicast requests, to which the targets may respond, or 4) by querying a storage name server for a list of targets that it can access.

Before iSCSI initiators can send SCSI commands to a target, it must first establish an iSCSI session. A session is composed of one or more TCP connections. The initiator establishes each TCP connection and begins the login phase of that connection. The login phase must be completed on each TCP connection before it can be used to transport SCSI commands.

iSCSI login is a mechanism used to establish a TCP connection, between initiators and targets. It authenticates the parties, negotiates the session's parameters, open security association protocol, and marks the connection as belonging to an iSCSI session. The initiator begins the login process by connecting to a well known TCP port. The target listens on the well-known TCP port for incoming connections.

A single TCP connection is established to transfer SCSI commands, data, and status information for a single "task." Communication between an initiator and target may occur over one or more TCP connections. One or more TCP connections linking an initiator and a target form a "session." A session is used to identify to a target all the connections with a given initiator. TCP connections may be added to or deleted from a session.

As part of the login process the initiator and target my wish to authenticate each other and set the security association protocol for the session. Once the login process has completed the iSCSI session is said to be in the full feature phase. The initiator may then send SCSI commands and data to the various LUs on the target by encapsulating them in iSCSI messages that are sent over the established iSCSI session.

Existing IP SAN and associated transports suffer from a number of known limitations. For example, iSCSI currently provides a mechanism to address LUNs but does not provide a mechanism to encapsulate data and control information within the same instance of a connection. As a result, separate data transport and control information transport mechanisms must be used and additional functionality (e.g., multipathing, session management, advanced flow control mechanisms) is not provided.

SUMMARY OF THE INVENTION

Disclosed is a method and system of providing a virtual transport session. Embodiments of the present invention may be used to allow data and control information to be transmitted using a single session between an initiator and a target within a storage system.

According to one embodiment, a virtual transport session is provided by establishing a virtual transport session between an initiator module and a target module across a network, wherein the virtual transport session comprises a transport session. Thereafter, information is transferred between the initiator module and the target module using the virtual transport session. According to another embodiment, establishing a virtual transport session between an initiator module and a target module across a network comprises associating a globally unique identifier to an initiator module.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
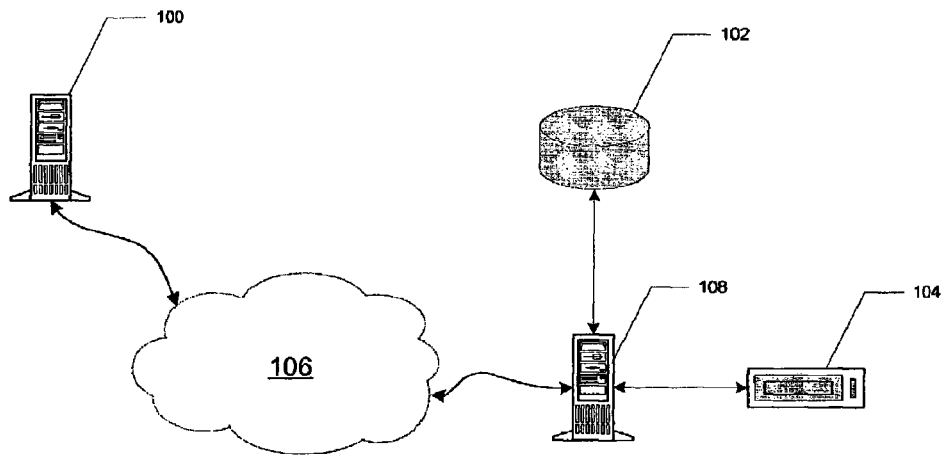
FIG. 1 illustrates an IP storage area network according to the prior art.
Figure 2:
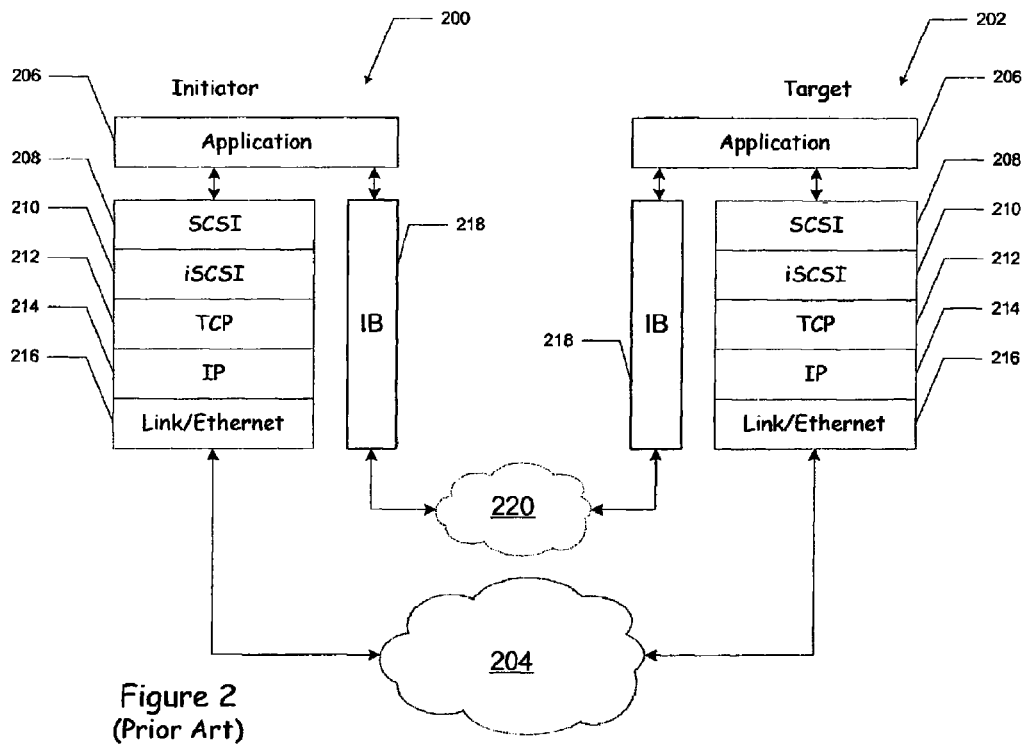
FIG. 2 illustrates protocol stacks according to the prior art.
Figure 3:
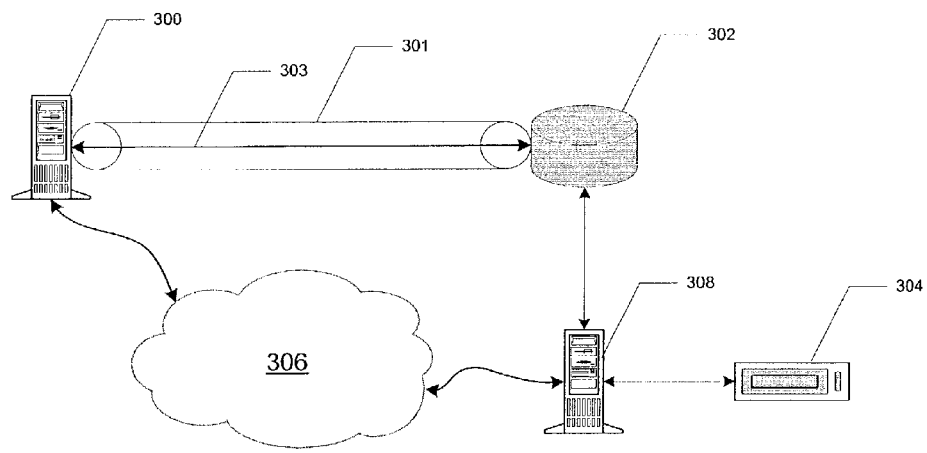
FIG. 3 illustrates an IP storage area network according to an embodiment of the present invention.

FIG. 3 illustrates an IP storage area network according to an embodiment of the present invention. The IP SAN of the illustrated embodiment includes a data processing system 300 which is coupled to a number of remote storage elements (e.g., disk drive 302 and tape drive 304) via a network 306 and a remote host 308 (e.g., a file server data processing system). More specifically, data processing system 300 is coupled to disk drive 302 in the illustrated embodiment using a virtual transport session 301 including at least one transport session 303 or "connection" as described herein. In the illustrated embodiment of FIG. 3, data processing system 300 acts as an initiator module, requesting access to disk drive 302 which in turn acts as a target module. While a single initiator and target have been illustrated within the embodiment of FIG. 3, multiple initiators and/or targets may transfer information, communicate, etc. utilizing a single transport session (e.g., transport session 303) associated with one or more virtual transport sessions. In such an embodiment, multiplexing/demultiplexing of information may be performed by or using a transport abstraction layer further described herein. Each transport session and virtual transport session may therefore be shared or exclusive, designated either in response to an initiator request, available resources, or a combination thereof.

In an alternative embodiment, virtual transport session 301 is associated with a globally unique identifier (GUID) for later reference and/or identification. Transport 303 may comprise any of a number of transports (e.g., iSCSI, Infiniband, TCP, TOE+RDMA, etc.) in various embodiments of the present invention. Consequently, not all features may be able to be emulated with every possible underlying transport (e.g., shared memory may be supported/implemented by Infiniband but not with iSCSI). According to an embodiment of the present invention therefore, an initiator module and/or target module may be informed of a utilized transport's capabilities/limitations prior to transmission. Virtual transport session 301 serves as a transport abstraction layer, providing an abstraction to its consumers from transport-specific details.

Figure 4:
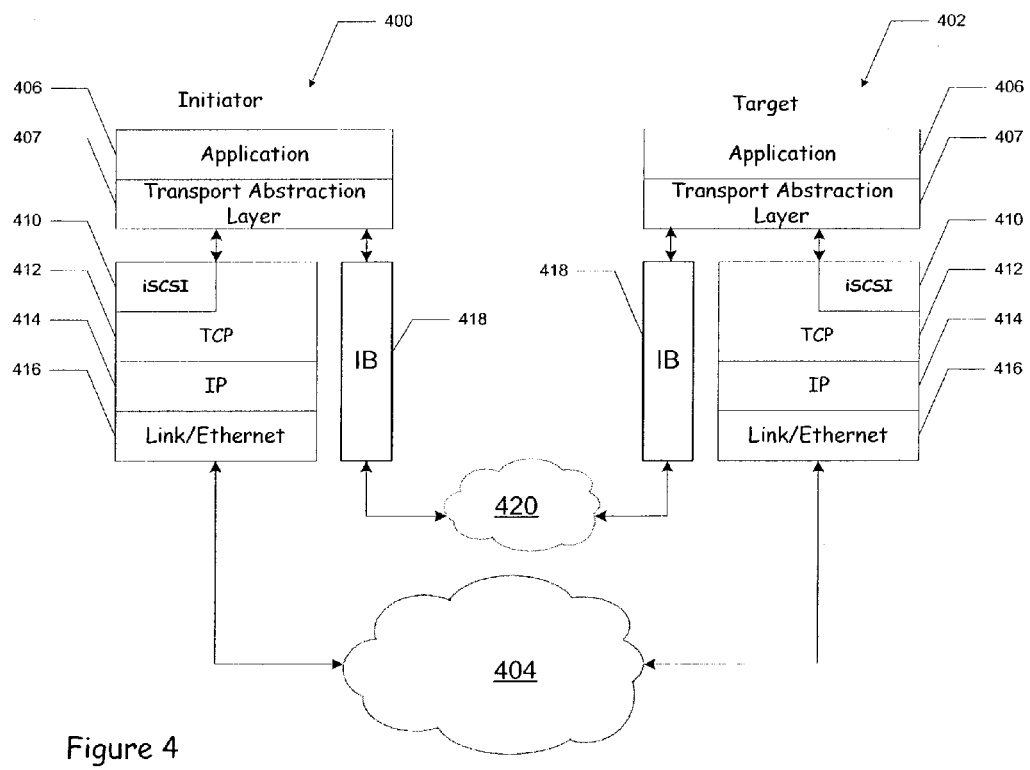
FIG. 4 illustrates protocol stacks according to an embodiment of the present invention.

FIG. 4 illustrates protocol stacks according to an embodiment of the present invention. In the depicted system, an initiator module 400 (e.g., a server) and a target module 402 (e.g., a data storage element) are coupled together via a network 404. Each module in turn implements a protocol stack including an application layer 406, a transport abstraction layer 407, one or more underlying transport layers such as iSCSI layer 410, TCP layer 412, and/or a TOE+RDMA transport (not illustrated), an IP layer 414, and a Link/Ethernet layer 416 as shown. Alternatively or additionally an initiator and target may be coupled together using an Infiniband (IB) stack 418 and an Infiniband network 420 as shown.

In a conventional iSCSI system, each stack layer provides an abstraction of one or more lower layers to the layer immediately above. Each layer may also operate on or with a distinct data unit type. Transport abstraction layer 407 provides an abstraction of actual transport mechanisms/layer used to transfer information between an initiator and target module so that higher-level layers (e.g., application layer 406) within initiator module 400 and target module 402 may be independent of the transport and specific path utilized. The virtualization can be accomplished using any hardware framework (e.g., an iSCSI host bus adapter, an Ethernet network interface card, etc., or any combination thereof).

In one embodiment of the present invention, transport abstraction layer 407 comprises a hardware-independent port driver and one or more hardware-dependent miniport drivers which are utilized together to provide initiator and target-required services. In another embodiment, miniport drivers may be embodied within loadable modules. The described port/miniport architecture is advantageous for making hardware changes/upgrades easy and seamless. In yet another embodiment, a miniport driver module is responsible for simulating a feature or service if necessary which is not provided/supported by the transport being used.

In a conventional network system, transports (e.g., iSCSI, IB, etc.) expect to post buffers to receive incoming information and include some sort of credit-based flow control mechanism. As no existing transport includes a separate credit mechanism for data and control information transfers, credits granted by target frequently end up consuming lots of a target's memory if an initiator is idle. According to one embodiment, separate flow control mechanisms are used for control information and data transfers. In one embodiment, a conventional credit mechanism is used for commands and a request to transmit (R2T) or RDMA callback mechanism is used for data transfers.

Traditionally, whenever a consumer (e.g., an initiator or target) posts buffers to an underlying transport, it is guaranteed that those buffers will be reserved for that particular consumer as long as a single consumer uses a single connection. Such a guarantee cannot be made (and consequently an underlying transport may use a posted buffer to receive a command for another consumer) when many consumers share a common physical connection as the underlying transport is not aware of sharing of a connection at higher level. According to one embodiment of the present invention, a resource (e.g., a buffer, a network "heartbeat" signal, etc.) is reserved for a virtual transport session by allocating, for example, using a port driver element of a transport abstraction layer such as that described herein, one or more buffers to receive commands and posting them to an underlying transport on behalf of a consumer.

Figure 5:
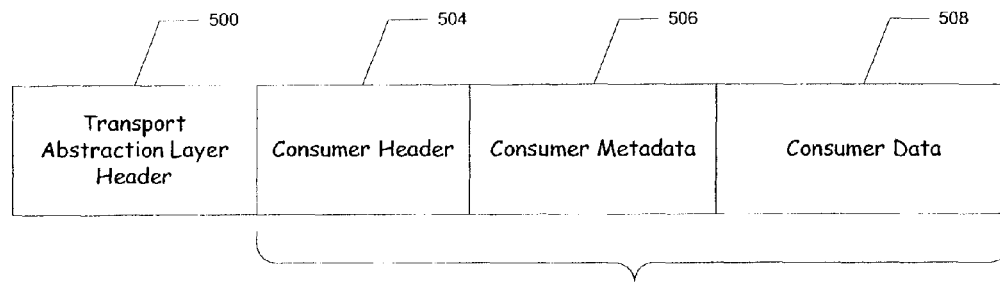
FIG. 5 illustrates a transport abstraction layer message format according to an embodiment of the present invention.

In the described embodiment, each control information or data message received consumes exactly one of such "work item" buffers. A pool of work item buffers is maintained from which they may be posted to a transport. According to one embodiment, the described pool includes sufficient work item buffers to satisfy all registered consumers (i.e. the sum of all command credits granted for all consumers using a particular connection). According to another embodiment, each work item buffer is large enough to hold an entire control information or data message FIG. 5 illustrates a transport abstraction layer message format according to an embodiment of the present invention. According to one embodiment, a transport abstraction layer such as that illustrates with respect to FIG. 4 is utilized to establish connections and exchange messages/commands among and/or between initiator and target modules. When a transport session is shared among a number of initiators and/or targets, each data unit or piece of information transmitted across the transport session therefore includes a transport session or transport abstraction layer header 500, a virtual transport session or consumer header 502, along with any consumer metadata 504. According to one embodiment, transport abstraction layer messages having the format described with respect to FIG. 5 may be no larger than a single work item described herein.

Figure 6:
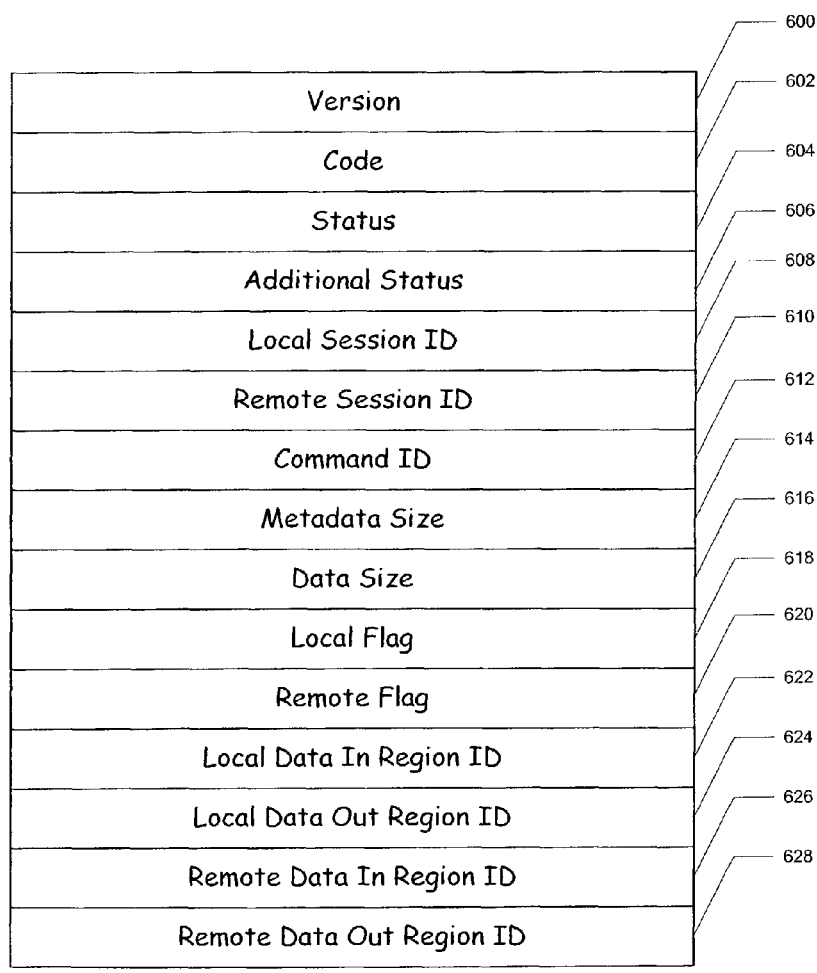
FIG. 6 illustrates elements of a transport abstraction layer header according to an embodiment of the present invention.

FIG. 6 illustrates elements of a transport abstraction layer header according to an embodiment of the present invention. The transport abstraction layer header of the illustrated embodiment includes a version field 600 utilized to indicate a particular version of a protocol associated with the methods and systems of the present invention. According to one embodiment, version field 600 comprises a version "number" having one or more numeric elements. Code field 602 is utilized to indicate the type (e.g., command, message, reply, etc.) of data being conveyed in an associated consumer message. The status (e.g., failed, completed, etc.) of a command/message may be indicated using status field 604. According to one embodiment, a value associated with status field 604 is valid only for messages of type "reply". Additional information regarding the status of a command/message may be indicated according to the illustrated embodiment of FIG. 6 using additional status field 606.

Local session ID field 608 and remote session ID field 610 of the illustrated transport abstraction layer header are used to identify a session on a local and remote machine, respectively. When a message is transferred from an initiator or "source" to a target, a local session identifier within the local session ID field 608 identifies a particular session on the source system that is the originator of the message and a remote session identifier within the remote session ID field 610 identifies a particular session on the target system that is the destination of the message. Similarly, a command/message, transferred from an initiator or "source" to a target, is uniquely identified by a command identifier within command ID field 612. According to one embodiment of the present invention, the command identifier is initialized by the source system with a unique identifying number. When the command is completed, the target system generates a reply message including the same number, allowing the source system to match the reply with the original command or request.

The transport abstraction layer header of the illustrated embodiment further includes a metadata size field 614 and a data size field 616 utilized, respectively, to indicate the size (e.g., in number of bytes) of consumer metadata and consumer data (e.g., payload data) in an associated consumer message. According to one embodiment, consumer data may be transferred with the consumer message itself. In another embodiment of the present invention consumer data is transferred using an alternative mechanism such as iSCSI's "request to transmit" (R2T) or Infiniband's "remote direct memory access" (RDMA) technique. Local flag field 618 and remote flag field 620 are utilized to indicate available resources and/or resource attributes (e.g., whether or not a buffer has been "locked" to prevent access) on a local and remote machine, respectively. According to one embodiment, when a target system generates a reply message it initializes the remote flag field 620 with the value of the local flag value from the original command/message received from the initiator on the source system.

Local data in region ID field 622 is utilized to indicate one or more memory regions locked for DMA transfer on a source/initiator system for a "data in" operation (e.g., a read command). According to one embodiment, local data in region ID field 622 may be used by a target system (returning data for a read operation) to directly write data to an initiator system's allocated memory. Local data out region ID field 624 is utilized to indicate one or more memory regions locked for DMA transfers on a source/initiator system for a "data out" operation (e.g. a write command). According to one embodiment, local data out region ID field 624 may be used by a target system (e.g., the target of a write operation) to directly read data from an initiator system's allocated memory.

Remote data in region ID field 626 is utilized to indicate one or more memory regions locked for DMA transfers on a target system for a "data in" operation (e.g., a write command with respect to an initiator). According to one embodiment, remote data in region ID field 626 may be used by a source machine to directly write data to a target system's allocated memory. Remote data out region ID field 628, by contrast is utilized to indicate one or more memory regions locked for DMA transfers on a target system for a "data out" operation (e.g., a read command with respect to an initiator). According to yet another embodiment, remote data out region ID field 628 may be utilized by an initiator system (e.g., the originator of a read operation) to directly read data from a target system's allocated memory It should be appreciated that the particular fields shown as well as their arrangement are meant to be illustrative rather than exhaustive and that different fields and/or arrangements may be implemented in alternative embodiments of the present invention.

Figure 7:
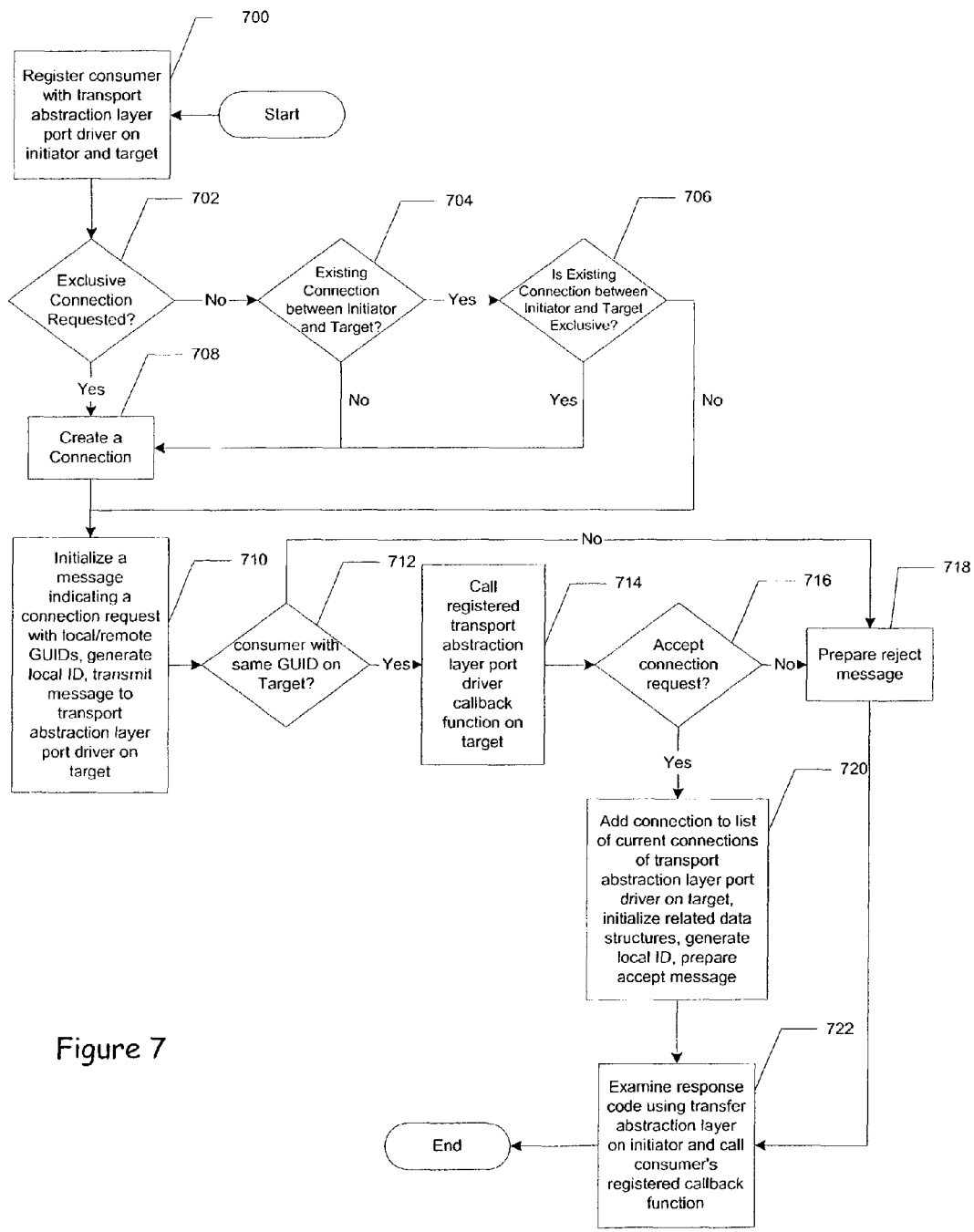
FIG. 7 illustrates a virtual transport session connection process according to an embodiment of the present invention.

FIG. 7 illustrates a virtual transport session connection process according to an embodiment of the present invention. A connection may be established between any two or more consumers and it may be specified whether a shared or exclusive connection is preferred or required. According to one embodiment, the illustrated process of FIG. 7 is initiated when a consumer or device calls, invokes, or otherwise executes a connect function of a port driver element of a transport abstraction layer with information or arguments such as a remote node's address, a remote consumer's globally unique identifier, a preferred transport to use, and shared/exclusive access requirements.

In the illustrated process embodiment, a consumer is registered with a transport abstraction layer port driver according to the present invention on both an initiator and a target module or node (process block 700). A determination is then made whether or not an exclusive connection has been requested (process block 702). If an exclusive connection is not required, a determination is made whether or not an existing connection exists between the current initiator and target modules (process block 704). If such a connection is found to exist, another determination is made whether or not the existing connection is itself exclusive (process block 706) thus preventing the connection from being shared by the current consumer.

If determinations are made that 1) an exclusive connection is required (process block 702), 2) no existing connection exists between the initiator and target modules (process block 704), or 3) an existing connection is itself exclusive (process block 706), a new connection is created (process block 708). According to one embodiment of the present invention, new connections are created using a miniport driver element of a transport abstraction layer. Once the new connection has been created or determinations have been made that an exclusive connection has not been requested (process block 702) and that a connection between the initiator and target exists (process block 704) and is shareable (process block 706), a message is initialized indicating a connection request including local/remote consumer globally unique identifiers (GUIDs), a local identifier is generated and stored within the message, and the message is then transferred to a transport abstraction layer port driver associated with the remote, target module (process block 710). The local identifier is similar to, but smaller than the globally unique identifiers (GUIDs), thus preventing the transport abstraction layer described herein from having to lookup the GUIDs as frequently to identify a consumer. In one embodiment, the local identifier is generated using the initiator and is 32 bits long.

Thereafter, a determination is made whether or not a consumer with the same GUID exists on the target. If not, a reject message is prepared (process block 718) resulting in a "reject function" being called. According to one embodiment, if a consumer with the same GUID is not registered on the remote node the request will fail. If a consumer with the same GUID is identified on the target however, a registered transport abstraction layer port driver callback function is called on the target/remote node (process block 714) indicating a connection request. Once the connection request has been indicated, a determination is made whether to accept or reject the request (process block 716). If a determination is made that the connection request is to be rejected, an appropriate reject message is initialized or generated (process block 718) and a reject function is called. According to one embodiment, "accept" or "reject" functions are used to initialize the transport abstraction layer header with an appropriate response code and a consumer's message (if any) is "piggy backed" from the target to the initiator. Once the reject message has been prepared (process block 718), the response code of a reply message's transport abstraction layer header is examined at the initiator and a registered callback function is called to indicate status using the remote consumer's message (process block 722).

If a determination is made that the connection request is to be accepted, the requested connection is added to a list of current connections of the target's transport abstraction layer port driver, related data structures are initialized, a local ID is generated, and an accept message is prepared (process block 720). According to one embodiment, the local ID is generated by extracting the sender's 32-bit local identifier and then generating an identical identifier for the reply message. In yet another embodiment of the present invention, command credits are decided and transferred to the transport abstraction layer port driver as a parameter of the "accept" function.

Once the accept message has been prepared (process block 720), the response code of a reply message's transport abstraction layer header is examined at the initiator and a registered callback function is called to indicate status using the remote consumer's message (process block 722). According to one embodiment of the present invention, if a connection is successful the initiator or local consumer initializes an associated data structure and extracts the remote consumer's local identifier to use in later communication. In the described embodiment, the remote end point may send data indicating its maximum buffer or "working item" size so that initiator can determine the largest message it may send in a single transfer. In yet another embodiment, the initiator examines the target's message reply and, if the connection request is accepted, extracts a command credit value for use with the transport abstraction layer. A connection established using the process illustrated by FIG. 7 may be disconnected using appropriate messages and modifications to one or more of the described data structures.

Figure 8A:
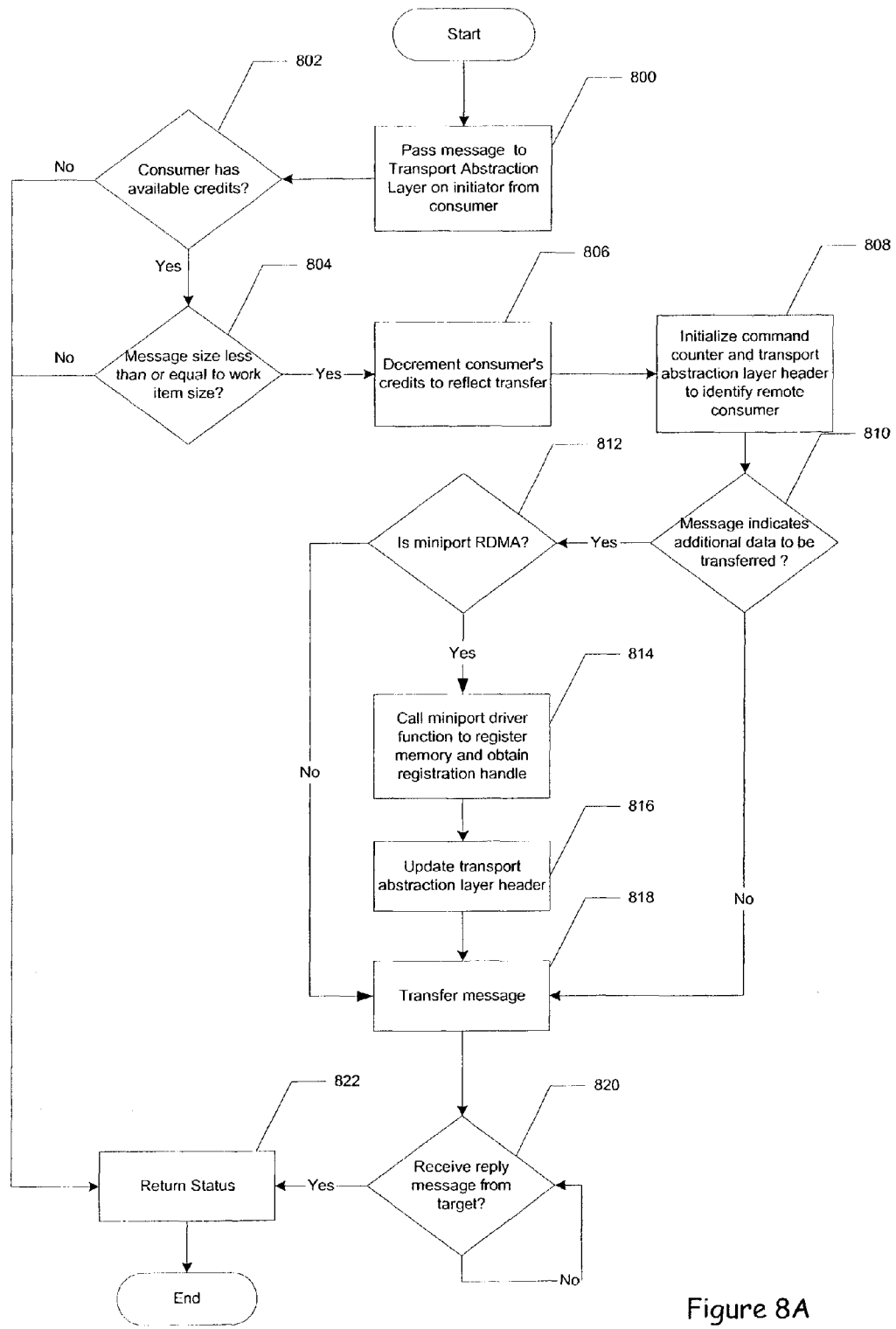
FIG. 8A illustrates an initiator virtual transport session send process according to an embodiment of the present invention.

FIG. 8A illustrates an initiator virtual transport session send process according to an embodiment of the present invention. In the illustrated process, a message is first passed from a consumer to a transport abstraction layer on an initiator module (process block 800). Thereafter, a determination is made whether or not the consumer issuing the command has available credits (process block 802) sufficient for carrying out the command. The command fails and this status is returned (process block 822) to the consumer if a determination is made that the consumer lacks sufficient credits. Otherwise, a determination is made whether the requested message size is less than or equal to the size of a work item (process block 804). If the requested message size is determined to be larger than a work item the requested command/message fails and this status is returned (process block 822) to the consumer. However, if it is determined that the requested message/command may be transmitted in a single work item, the consumer's credit(s) are decremented to reflect the requested transfer (process block 806) as shown. In an alternative embodiment of the present invention, a command/ message is queued (e.g., stored temporarily in a "wait" queue or buffer) until sufficient credits become available in response to a determination (process block 802) that the consumer currently lacks sufficient credits.

Subsequently, a command counter and transport abstraction layer header are initialized to identify a remote consumer (process block 808) and another determination is made whether the requested command indicates that additional data is to be transferred (process block 810) for example, via R2T or RDMA. If additional data is to be transferred, yet another determination is made whether or not the additional data is to be transferred using RDMA and an associated miniport (process block 812). If a determination is made that the additional data is to be transferred using RDMA, a miniport driver function is called to register memory and obtain a registration handle (process block 814) used to store and transfer the additional data and a transport abstraction layer header is updated (process block 816). Thereafter, or if another technique (e.g., R2T) is used, or if no additional data is to be transferred, the message is transferred (process block 818). Once the message has been transferred, the initiator waits to receive a reply message from its intended target (process block 820) prior to returning status indicating the completion of the command (process block 822).

Figure 8B:
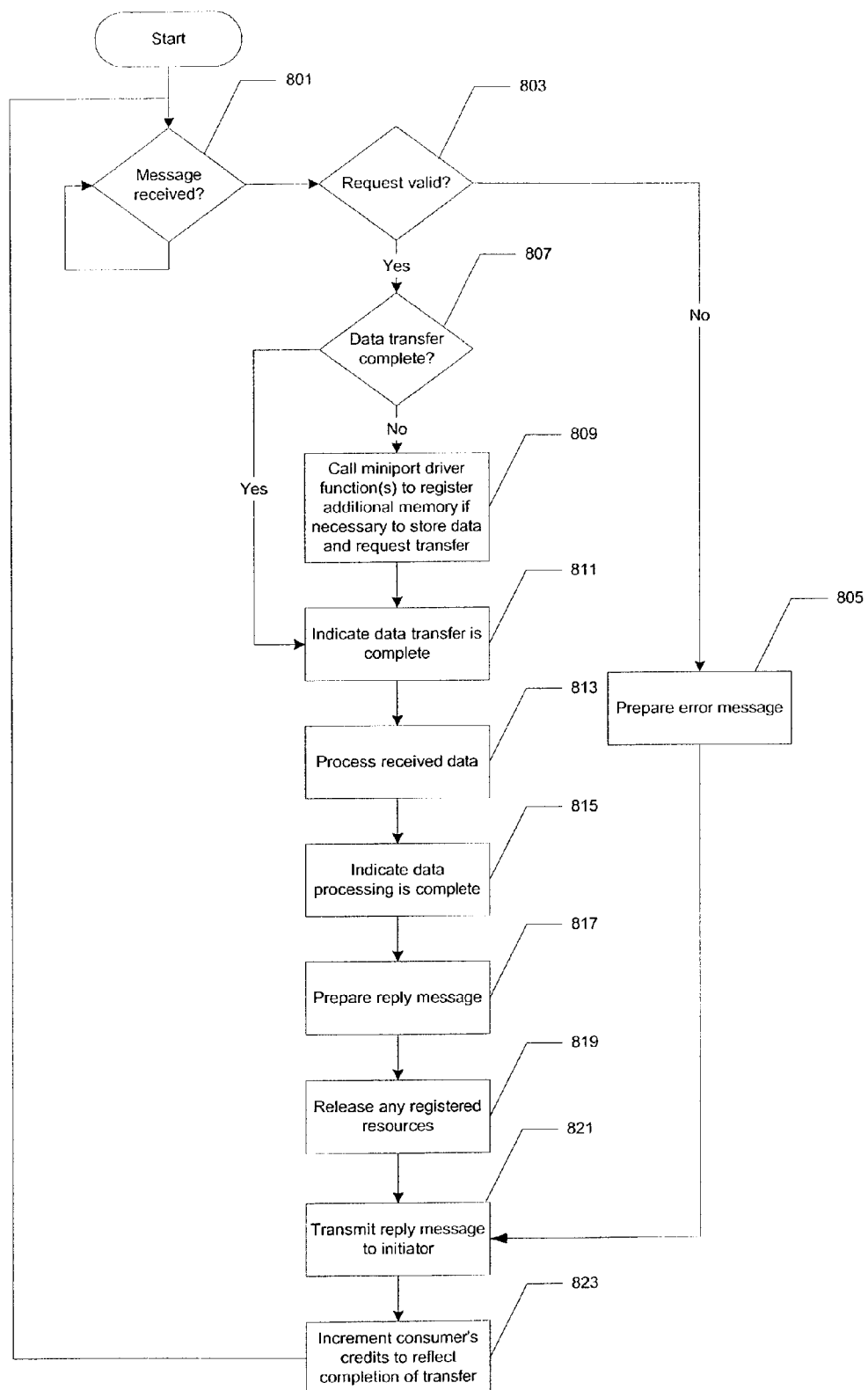
FIG. 8B illustrates a target virtual transport session send process according to an embodiment of the present invention.

FIG. 8B illustrates a target virtual transport session send process according to an embodiment of the present invention. In the illustrated process, a target module waits to receive a message (process block 801) from an initiator. Once a message is received, a determination is made whether the requested command associated with the message is valid (process block 803). An invalid command request results in the preparation of an error message (process block 805) to be transmitted as a reply message to the initiator (process block 821) according to the illustrated process embodiment. In response to a determination that the received command request is valid however, another determination is made whether the data transfer is complete (process block 807). If data remains to be transferred, appropriate miniport driver function(s) are called to register additional memory if necessary (e.g., if an RDMA transfer is to be performed) to store the remaining data and to request additional data transfer (process block 809). Thereafter, or if a determination is made initially that all data has been transferred successfully, the completion of data transfer is indicated (process block 811).

Once all data transfer has completed, the received data is processed (process block 813) and the completion of such processing is indicated (process block 815). Thereafter, a reply message is prepared (process block 817) for transmission to the appropriate initiator and any resources (e.g., memory) allocated or registered during the illustrated send process are released (process block 819). The reply message is then transmitted to the initiator (process block 821) and the initiating consumer's credits are incremented to indicate successful completion of the requested operation (process block 823). The target associated with the illustrated process of FIG. 8B then waits until another initiator message is received.

Figure 9A:
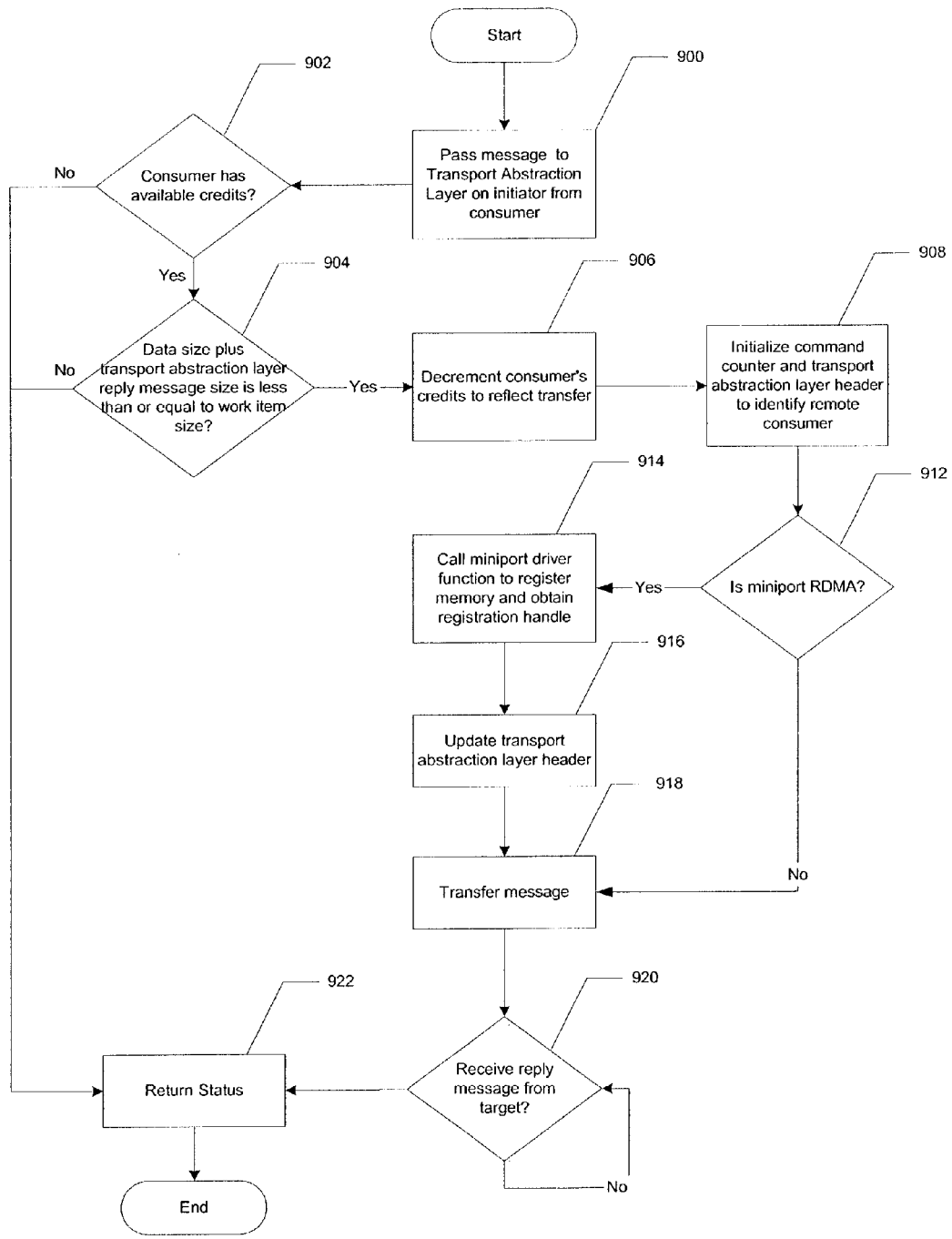
FIG. 9A illustrates an initiator virtual transport session receive process according to an embodiment of the present invention.

FIG. 9A illustrates an initiator virtual transport session receive process according to an embodiment of the present invention. In the illustrated process, a message is first passed from a consumer to a transport abstraction layer on an initiator module (process block 900). Thereafter, a determination is made whether or not the consumer issuing the command has available credits (process block 902) sufficient for carrying out the command. The command fails and this status is returned (process block 922) to the consumer if a determination is made that the consumer lacks sufficient credits. In an alternative embodiment of the present invention, a command/ message is queued (e.g., stored temporarily in a "wait" queue or buffer) until sufficient credits become available in response to such a determination.

If a determination is made that the consumer has sufficient credits, a determination is then made whether the size of the data to be transferred plus the size of the transport abstraction layer reply message is less than or equal to the size of a work item (process block 904). If the size of the data to be transferred plus the size of the transport abstraction layer reply message is determined to be larger than a work item, the requested command/message fails and this status is returned (process block 922) to the consumer. Otherwise, the consumer's credit(s) are decremented to reflect the requested transfer (process block 906) as shown.

Subsequently, a command counter and transport abstraction layer header are initialized to identify a remote consumer (process block 908) and a determination is made whether or not additional data is to be transferred using RDMA and an associated miniport (process block 912). If a determination is made that additional data is to be transferred using RDMA, a miniport driver function is called to register memory and obtain a registration handle (process block 914) used to store and transfer the additional data and a transport abstraction layer header is updated (process block 916). Thereafter, or if another technique (e.g., R2T) is used, the message is transferred (process block 918). Once the message has been transferred, the initiator waits to receive a reply message from its intended target (process block 920) prior to returning status indicating the successful completion of the command (process block 922).

Figure 9B:
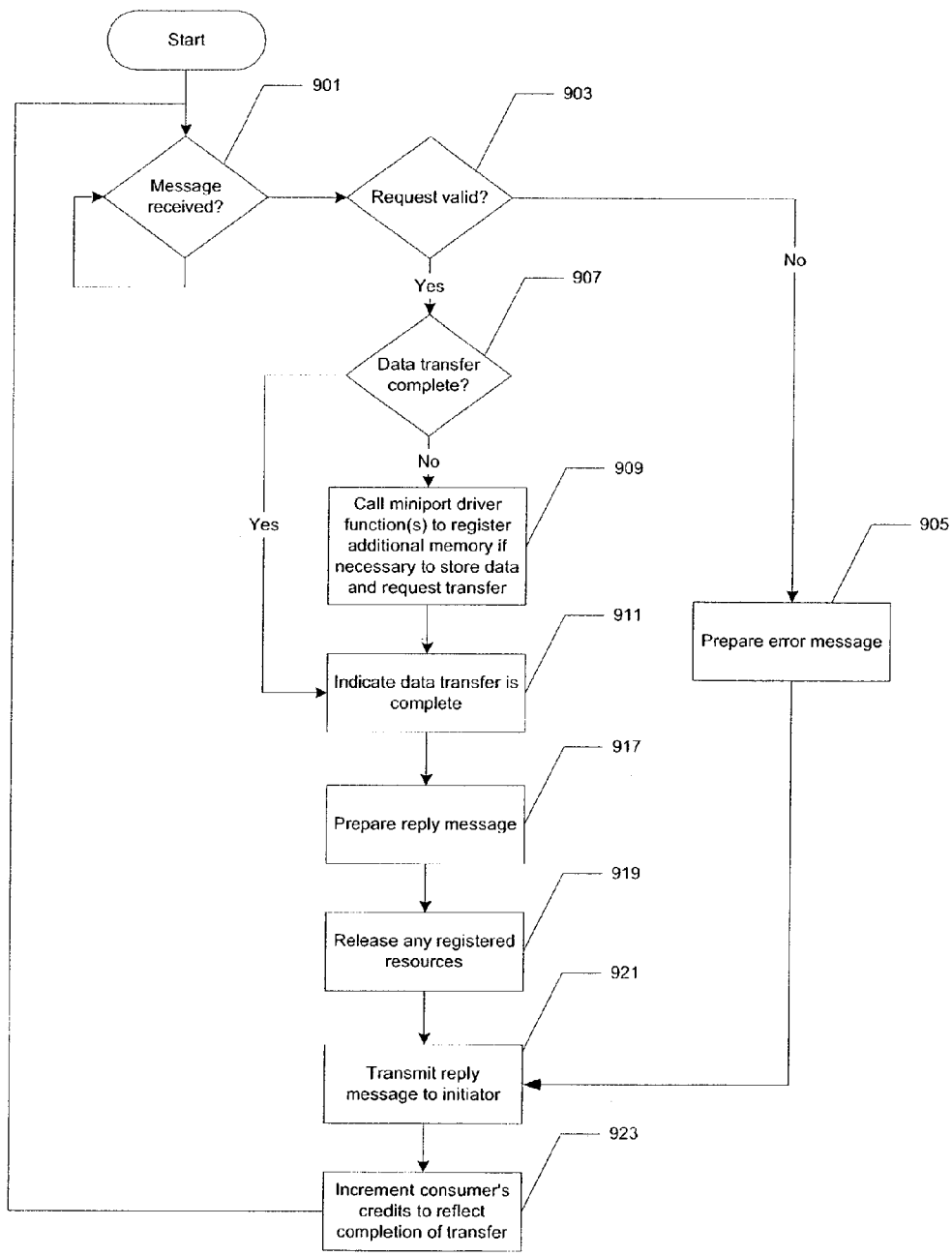
FIG. 9B illustrates a target virtual transport session receive process according to an embodiment of the present invention.

FIG. 9B illustrates a target virtual transport session receive process according to an embodiment of the present invention. In the illustrated process, a target module waits to receive a message (process block 901) from an initiator. Once a message is received, a determination is made whether the requested command associated with the message is valid (process block 903). An invalid command request results in the preparation of an error message (process block 905) to be transmitted as a reply message to the initiator (process block 921) according to the illustrated process embodiment. In response to a determination that the received command request is valid however, another determination is made whether the data transfer is complete (process block 907). If data remains to be transferred, appropriate miniport driver function(s) are called to register additional memory if necessary (e.g., if an RDMA transfer is to be performed) to store the remaining data and to request additional data transfer (process block 909). Thereafter, or if a determination is made initially that all data has been transferred successfully, the completion of data transfer is indicated (process block 911).

Thereafter, a reply message is prepared (process block 917) for transmission to the appropriate initiator and any resources (e.g., memory) allocated or registered during the illustrated receive process are released (process block 919). The reply message is then transmitted to the initiator (process block 921) and the initiating consumer's credits are incremented to indicate successful completion of the requested operation (process block 923). The target associated with the illustrated process of FIG. 9B then waits until another initiator message is received.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future.

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
  receiving a first block-level storage command and a second block-level storage command at a host data processing system, wherein
    the first block-level storage command is received from a first consumer,
    the second block-level storage command is received from a second consumer,
    the first block-level storage command and the second block-level storage command are each addressed to a target block-level storage device, and
    the target block-level storage device is remotely coupled to the host data processing system via a network;
  establishing a first virtual transport session, wherein
    the first virtual transport session communicatively couples the host data processing system and the target block-level storage device, and
    the first virtual transport session comprises a transport session established across the network between the host data processing system and the target block-level storage device;
  establishing a second virtual transport session, wherein
    the second virtual transport session communicatively couples the host data processing system and the target block-level storage device, and
    the second virtual transport session comprises the transport session;
  transmitting a first consumer message from the host data processing system to the target block-level storage device using the first transport session, wherein
    the first consumer message comprises the first block-level storage command; and
  transmitting a second consumer message from the host data processing system to the target block-level storage device using the second virtual transport session, wherein
    the second consumer message comprises the second block-level storage command.

2. The method of claim 1, wherein the establishing the first virtual transport session comprises
  associating a globally unique identifier with the first virtual transport session.

3. The method of claim 2, wherein the establishing the first virtual transport session further comprises
  providing the globally unique identifier to the host data processing system.

4. The method of claim 1, wherein said establishing the first virtual transport session comprises
  reserving a resource for the first virtual transport session.

5. The method of claim 1, further comprising:
  determining whether the first virtual transport session is configured to be shared; and
  sharing the first virtual transport session between a plurality of consumers, in response to a determination that the first virtual transport session is configured to be shared, wherein
    the plurality of consumers comprise a plurality of initiator modules at the host data processing system.

6. The method of claim 1, further comprising:
  sharing the first virtual transport session between a plurality of consumers, in response to a determination that the first virtual transport session is configured to be shared, wherein
    the plurality of consumers comprise a plurality of target modules at the target block-level storage device.

7. The method of claim 1, further comprising:
transmitting control information and data between the host data processing system and the target block-level storage device using the first virtual transport session.

8. The method of claim 7, further comprising:
controlling an amount of the control information transmitted between the host data processing system and the target block-level storage device by utilizing a first flow control mechanism,
   wherein the first flow control mechanism places a maximum limit on a number of block-level storage commands transmitted from the host data processing system; and
controlling an amount of the data transmitted between the host data processing system and the target block-level storage device by utilizing a second flow control mechanism,
   wherein the second flow control mechanism is a request to transmit or remote direct memory access mechanism.

9. The method of claim 8, wherein
the first flow control mechanism is a credit mechanism,
the credit mechanism assigns the host data processing system a number of command credits,
the number of command credits is decremented for each block-level storage command that the host data processing system transmits to the target block-level storage device, and
the number of command credits is incremented once said each block-level storage command is completed.

10. The method of claim 1, further comprising:
establishing an Internet Small Computer System Interface (iSCSI) session,
   wherein the transport session is the iSCSI session, and
   wherein the first block-level storage command is a Small Computer System Interface (SCSI) command;
encapsulating the first block-level storage command in an iSCSI protocol data unit (PDU); and
adding a virtual transport header to the iSCSI PDU,
   wherein the virtual transport header and iSCSI PDU is transmitted to the target block-level storage device.

11. The method of claim 10, further comprising:
receiving control information and data from the target block-level storage device using said virtual transport session, wherein
   said control information and data are encapsulated in a response iSCSI PDU,
   said control information comprises a status of the first block-level storage command, and
   said status describes whether the logical unit successfully performed the first block-level storage command.

12. The method of claim 1, wherein
the first virtual transport session represents the target block-level storage device to said host data processing system as being directly connected to said host data processing system, and
the establishing the first virtual transport session comprises
   sending a request message from the host data processing system to a transport abstraction layer port driver associated with target block-level storage device, and
   in response to the transport abstraction layer port driver processing the request message, receiving an accept message from the transport abstraction layer port driver at the host data processing system.

13. The method of claim 1, further comprising:
determining an identifier of the target block-level storage device, wherein the identifier uniquely identifies the target block-level storage device in the network, and
encapsulating the first block-level storage command with a path address, wherein
   the first block-level storage command is addressed to a logical unit address of the target block-level storage device,
   the path address corresponds to the logical unit address of the target block-level storage element, and
   the path address comprises the identifier.

14. The method of claim 1, wherein
the establishing the first virtual transport session comprises
   generating a first session identifier (SID) that identifies the first virtual transport session, and
   generating a first command identifier (CID) that identifies the first block-level storage command,
the establishing the second virtual transport session comprises
   generating a second SID that identifies the second virtual transport session, and
   generating a second CID that identifies the second block-level storage command,
the first consumer message further comprises a first virtual transport session (VTS) header,
the first VTS header comprises the first SID and the first CID,
the second consumer message further comprises a second VTS header, and
the second VTS header comprises the second SID and the second CID.

15. The method of claim 14, further comprising
receiving a third block-level storage command at the host data processing system, wherein
   the third block-level storage command is received from a third consumer, and
   the third block-level storage command is addressed to the target block-level storage device;
generating a third CID that identifies the third block-level storage command; and
transmitting a third consumer message from the host data processing system to the target block-level storage device via the transport session, wherein
   the third consumer message comprises a third VTS header and the third block-level storage command, and
   the third VTS header comprises the first SID and the third CID.

16. The method of claim 1, wherein
the target block-level storage device comprises a hard drive configured to perform block-level read and write commands, and
the first block-level storage command comprises one of a block-level read command and a block-level write command.

17. A system comprising:
a network;
a host data processing system comprising a first initiator module and a second initiator module, wherein said host data processing system is coupled to the network;
a target block-level storage device comprising a target module, wherein the target block-level storage device is coupled to the network; and a transport abstraction layer configured to
    receive a first block-level storage command and a second
        block-level storage command, wherein
        the first block-level storage command is received
            from the first initiator module,
        the second block-level storage command is received
            from the second initiator module,
        the first block-level storage command and the second
            block-level storage command are each addressed to
            the target module;
    establish a first virtual transport session between the first
        initiator module and the target module across said
        network, wherein
        the first virtual transport session communicatively
            couples the first initiator module and the target
            module, and
        the first virtual transport session comprises a transport
            session established across the network between the
            host data processing system and the target block-
            level storage device;
    establish a second virtual transport session between the
        second initiator module and the target module,
        wherein
        the second virtual transport session communicatively
            couples the second initiator module and the target
            module, and
        the second virtual transport session comprises the
            transport session;
    transfer a first consumer message to the target module
        using the first virtual transport session, wherein
        the first consumer message comprises the first block-
            level storage command; and
    transfer a second consumer message to the target module using the second virtual transport session, wherein
        the second consumer message comprises the second
            block-level storage command.

18. The system of claim 17, wherein
the transport abstraction layer is further configured to
    transfer the first consumer message and the second consumer message to the target block-level storage device
    using the transport session,
the target block-level storage device comprises a port
    driver element of the transport abstraction layer,
the port driver element is configured to receive the first
    consumer message and the second consumer message
    via the transport session, and
the port driver element is further configured to post the first
    block-level command of the first consumer message and
    the second block-level command of the second consumer message to a resource associated with the target
    module.

19. A non-transitory machine-readable storage medium
having a plurality of instructions executable by a machine
embodied therein, wherein said plurality of instructions when
executed cause said machine to perform a method comprising:
    receiving a first block-level storage command and a second
        block-level storage command at a host data processing
        system, wherein
        the first block-level storage command is received from a
            first consumer,
        the second block-level storage command is received
            from a second consumer,
        the first block-level storage command the second block-
            level storage command are each addressed to a target
            block-level storage device, and
        the target block-level storage device is remotely coupled
            to the host data processing system via a network;
    establishing a first virtual transport session, wherein
        the first virtual transport session communicatively
            couples the host data processing system and the target
            block-level storage device, and
        the first virtual transport session comprises a transport
            session established across the network between the
            host data processing system and the target block-level
            storage device;
    establishing a second virtual transport session, wherein
        the second virtual transport session communicatively
            couples the host data processing system and the target
            block-level storage device, and
        the second virtual transport session comprises the transport session;
    transmitting a first consumer message from the host data
        processing system to the target block-level storage
        device using the first virtual transport session, wherein
        the first consumer message comprises the first block-
            level storage command; and
    transmitting a second consumer message from the host
        data processing system to the target block-level storage
        device using the second virtual transport session,
        wherein
        the second consumer message comprises the second
            block-level storage command.

20. The non-transitory machine-readable storage medium
of claim 19, wherein the establishing the first virtual transport
session comprises
    associating a globally unique identifier with the first virtual
        transport session.

21. The non-transitory machine-readable storage medium
of claim 15, wherein the establishing the first virtual transport
session further comprises
    providing the globally unique identifier to the host data
        processing system.

22. The non-transitory machine-readable storage medium
of claim 19, wherein the establishing the first virtual transport
session comprises
    reserving a resource for the first virtual transport session.

23. The non-transitory machine-readable storage medium
of claim 19, said method further comprising:
    determining whether the first virtual transport session is
        configured to be shared; and
    sharing the first virtual transport session between a plurality of consumers, in response to a determination that the
        first virtual transport session is configured to be shared,
        wherein
        the plurality of consumers comprise a plurality of initiator modules at the host data processing system.

24. The non-transitory machine-readable storage medium
of claim 19, said method further comprising:
    sharing the first virtual transport session between a plurality of consumers, in response to a determination that the
        first virtual transport session is configured to be shared,
        wherein
        the plurality of consumers comprise a plurality of target
            modules at the target block-level storage device.

25. The non-transitory machine-readable storage medium of claim 19, said method further comprising:
transmitting control information and data between the host data processing system and the target block-level storage device using the first virtual transport session.

26. The non-transitory machine-readable storage medium of claim 25, said method further comprising:
controlling an amount of the control information transmitted between the host data processing system and the target block-level storage device by utilizing a first flow control mechanism,
wherein the first flow control mechanism places a maximum limit on a number of block-level storage commands transmitted from the host data processing system; and
controlling an amount of the data transmitted between the host data processing system and the target block-level storage device by utilizing a second flow control mechanism,
wherein the second flow control mechanism is a request to transmit or remote direct memory access mechanism.

27. The non-transitory machine-readable storage medium of claim 26, wherein
the first flow control mechanism is a credit mechanism,
the credit mechanism assigns the host data processing system a number of command credits,
the number of command credits is decremented for each block-level storage command the host data processing system transmits to the target block-level storage device, and
the number of command credits is incremented once said each block-level storage command is completed.

28. The non-transitory machine-readable storage medium of claim 19, said method further comprising:
establishing an Internet Small Computer System Interface (iSCSI) session,
wherein the transport session is the iSCSI session, and
wherein the first block-level storage command is a Small Computer System Interface (SCSI) command;
encapsulating the first block-level storage command in an iSCSI protocol data unit (PDU); and
adding a virtual transport header to said iSCSI PDU,
wherein the header and iSCSI protocol data unit is transmitted to the target block-level storage device.

* * * * *